(12) United States Patent
Tamura

(10) Patent No.: US 9,130,412 B2
(45) Date of Patent: Sep. 8, 2015

(54) MOTOR DRIVE ASSEMBLY FOR A VEHICLE

(71) Applicant: Shiro Tamura, Shizuoka (JP)

(72) Inventor: Shiro Tamura, Shizuoka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 14/380,087

(22) PCT Filed: Feb. 22, 2013

(86) PCT No.: PCT/JP2013/054527
§ 371 (c)(1),
(2) Date: Aug. 21, 2014

(87) PCT Pub. No.: WO2013/125682
PCT Pub. Date: Aug. 29, 2013

(65) Prior Publication Data
US 2015/0038277 A1    Feb. 5, 2015

(30) Foreign Application Priority Data
Feb. 24, 2012    (JP) .................. 2012-038835

(51) Int. Cl.
*B60K 17/16*    (2006.01)
*H02K 7/00*    (2006.01)
(Continued)

(52) U.S. Cl.
CPC *H02K 7/006* (2013.01); *B60K 1/00* (2013.01); *B60K 17/16* (2013.01); *B60K 17/356* (2013.01); *B60L 15/2054* (2013.01); *F16H 63/30* (2013.01); *H02K 1/28* (2013.01); *H02K 7/083* (2013.01); *H02K 7/108* (2013.01); *H02K 7/116* (2013.01); *H02K 11/0031* (2013.01); *B60K 2001/001* (2013.01); *B60L 2240/421* (2013.01); *B60L 2240/507* (2013.01); *B60L 2270/145* (2013.01); *F16H 3/089* (2013.01); *F16H 2063/3093* (2013.01); *H02K 5/24* (2013.01); *Y02T 10/641* (2013.01)

(58) Field of Classification Search
CPC ..... F16H 48/08; F16H 48/145; F16H 48/147; F16H 2048/364; F16H 2048/366; B60K 17/06; B60K 17/16; B60K 17/356
See application file for complete search history.

(56) References Cited

U.S. PATENT DOCUMENTS

2003/0146667 A1    8/2003    Hattori et al.
2012/0158233 A1    6/2012    Makino

FOREIGN PATENT DOCUMENTS

JP    09-224359    8/1997
JP    2003-235210    8/2003
(Continued)

OTHER PUBLICATIONS

International Search Report issued Apr. 16, 2013 in International (PCT) Application No. PCT/JP2013/054527.
(Continued)

*Primary Examiner* — Huan Le
(74) *Attorney, Agent, or Firm* — Wenderoth, Lind & Ponack, L.L.P.

(57) ABSTRACT

A motor drive assembly for a vehicle is provided and includes an electric motor. A rotor of the electric motor includes a spindle rotatably supported by a first bearing located on a first side of the spindle close to a speed reducer and a second bearing located on a second side of the spindle opposite from the first side of the spindle and remote from the speed reducer. The spindle includes a tubular, hollow, rotor core mounting portion having an inner diameter larger than the diameter of a cylindrical surface on which the first bearing is fitted.

22 Claims, 12 Drawing Sheets

(51) Int. Cl.
*H02K 7/116* (2006.01)
*B60K 1/00* (2006.01)
*F16H 63/30* (2006.01)
*B60K 17/356* (2006.01)
*H02K 1/28* (2006.01)
*H02K 7/08* (2006.01)
*H02K 11/00* (2006.01)
*B60L 15/20* (2006.01)
*H02K 7/108* (2006.01)
*F16H 3/089* (2006.01)
*H02K 5/24* (2006.01)

(56) References Cited

FOREIGN PATENT DOCUMENTS

| | | |
|---|---|---|
| JP | 2006-166491 | 6/2006 |
| JP | 2006166491 A * | 6/2006 |
| JP | 2011-058534 | 3/2011 |
| WO | WO 2011030670 A1 * | 3/2011 |

OTHER PUBLICATIONS

Written Opinion of the International Searching issued Apr. 16, 2013 in corresponding International PCT/JP2013/054527 (with English translation).

* cited by examiner

MOTOR DRIVE ASSEMBLY FOR A VEHICLE

TECHNICAL FIELD

The present invention relates to a motor drive assembly for a vehicle in which the rotation speed of an electric motor is changed and the changed rotation speed is transmitted to vehicle wheels.

BACKGROUND ART

As a conventional motor drive assembly for a vehicle used in electric vehicles and hybrid vehicles, a motor drive assembly is disclosed (e.g. in Japanese Unexamined Patent Application Publication No. 2011-58534) which includes an electric motor, a speed reducer which reduces the rotation speed output from the electric motor, and a differential which distributes the rotation output from the speed reducer to right and left vehicle wheels, the speed reducer having a plurality of interchangeable speed reduction ratios.

By use of this motor drive assembly, it is possible to use the optimum speed reduction ratio of the speed reducer according to the travel conditions, and thus to use the electric motor in the rotation range and torque range in which energy efficiency is high, both while the vehicle is being driven and during regenerative braking. Also, it is possible to reduce the rotation speeds of rotating members of the speed reducer by use of the optimum speed reduction ratio, while the vehicle is travelling at a high speed. As a result thereof, it is possible to reduce the power loss of the speed reducer and thus improve the energy efficiency of the vehicle.

In recent years, since the issue of global environment or energy is drawing a lot of attention, the development of electric vehicles or hybrid vehicles is being promoted accordingly. Now, it is recognized as an important issue to improve the energy efficiency of electric vehicles or hybrid vehicles, and thus it is becoming important to lighten the weight of the vehicles.

The inventor of the present invention studied how to lighten an electric motor, which is a driving source of a motor drive assembly for a vehicle, so as to lighten the motor drive assembly, and made an experiment to evaluate an electric motor configured as illustrated in FIG. 13.

An electric motor 90 illustrated in FIG. 13 includes an annular stator 91, and a rotor 92 arranged inside of the stator 91. The rotor 92 receives a rotating force from the stator 91 so as to rotate. The rotor 92 includes a spindle 94 supported by a pair of bearings 93 arranged so as to be axially spaced apart from each other, and a rotor core 95 mounted on the outer periphery of the spindle 94.

In order to lighten the spindle 94, the spindle 94 includes a tubular, rotor core mounting portion 96 which has its both ends open, a shaft 97 axially extending through the interior of the tubular, rotor core mounting portion 96, and a flange 98 through which the shaft 97 and the rotor core mounting portion 96 are coupled together. This spindle 94 is lightweight, since the rotor core mounting portion 96 is hollow even though the shaft 97 and the flange 98 are not hollow.

However, the inventor discovered that in the arrangement of the electric motor 90 illustrated in FIG. 13, since the shaft 97, of which the "second moment of area" is small, receives moment loads applied between the pair of bearings 93 supporting the spindle 94, torsional vibration or flexural vibration tends to occur in the shaft 97, which might cause vibration or abnormal noise to occur from the electric motor 90, while the electric motor 90 is rotating at a low speed.

SUMMARY OF THE INVENTION

It is an object of the present invention to provide a lightweight motor drive assembly for a vehicle in which vibration is less likely to occur.

In order to achieve the above-described object, the present invention provides a motor drive assembly for a vehicle which comprises: an electric motor including an annular stator, a rotor configured to rotate inside of the stator, and a motor housing in which the stator and the rotor are received; a speed reducer configured to reduce the rotation speed output from the electric motor; and a differential configured to distribute the rotation output from the speed reducer to right and left vehicle wheels, wherein the rotor of the electric motor comprises a spindle rotatably supported by a first bearing located on a first side of the spindle close to the speed reducer and a second bearing located on a second side of the spindle opposite from the first side and remote from the speed reducer, and a rotor core mounted on the outer periphery of the spindle and configured to receive a rotating force from the stator, wherein the spindle comprises a first shaft portion having on the outer periphery of the first shaft portion a cylindrical first bearing fitting surface on which the first bearing is fitted, and a tubular, hollow, rotor core mounting portion having an inner diameter larger than the diameter of the first bearing fitting surface, and wherein the first shaft portion is coupled to an end plate closing the end portion of the rotor core mounting portion on a first side of the rotor core mounting portion close to the speed reducer.

In this arrangement, since the rotor core mounting portion of the spindle is a tubular hollow portion, it is possible to obtain a high "second moment of area" even though the spindle is lightweight. Also, since the rotor core mounting portion, of which the "second moment of area" is high, receives moment loads applied between the first bearing and the second bearing supporting the spindle, torsional vibration or flexural vibration are less likely to occur in the spindle.

Furthermore, if the rotor core mounting portion has an inner diameter larger than the outer diameter of the first bearing, it is possible to more effectively increase the rigidity of the rotor core mounting portion against flexural loads or torsional loads applied to the rotor core mounting portion 19.

It is preferable that the first shaft portion and the rotor core mounting portion are integrally formed from a single member. With this arrangement, since there is no joint between the first shaft portion and the rotor core mounting portion through which a rotating force is transmitted from the rotor core to the speed reducer, the spindle has high durability.

It is preferable that the rotor core mounting portion of the spindle has an open end portion on a second side of the rotor core mounting portion opposite from the first side of the rotor core mounting portion and remote from the speed reducer, and that the rotor core mounting portion is formed on the inner periphery of the rotor core mounting portion with a cylindrical surface on which the second bearing is fitted. In this arrangement, since the second bearing, which supports the spindle, is arranged inside of the tubular, hollow, rotor core mounting portion, the distance between the first bearing and the second bearing, which support the spindle, is short compared to the arrangement in which the second bearing is arranged outside of the rotor core mounting portion. As a result thereof, it is possible to effectively restrain the vibration of the spindle.

Though the speed reducer may have a single speed reduction ratio, the speed reducer may also have a plurality of interchangeable speed reduction ratios. In the latter arrangement, it is possible to use the optimum speed reduction ratio of the speed reducer according to the travel speed of the vehicle, and thus to use the electric motor in the rotation range in which energy efficiency is high. As a result thereof, it is possible to use a small-sized motor as the electric motor, and thus to effectively lighten the motor drive assembly.

The speed reducer may comprise: an input shaft to which the rotation of the electric motor is input; a first input gear and a second input gear which are provided on the input shaft so as to rotate together with the input shaft; an output shaft arranged so as to be spaced apart from and be in parallel to the input shaft; a first output gear and a second output gear which are provided on the output shaft so as to be rotatable relative to the output shaft and which mesh with the first input gear and the second input gear, respectively; a first clutch incorporated between the first output gear and the output shaft; a second clutch incorporated between the second output gear and the output shaft; a speed change actuator by which either one of the first clutch and the second clutch is selectively engaged; and a differential drive gear through which the rotation of the output shaft is transmitted to the differential.

In the motor drive assembly in which such a speed reducer is used, of the first clutch and the second clutch, the clutch of the current gear position is disengaged and the clutch of the next gear position is engaged by the speed change actuator, so as to change the speed reduction ratio of the speed reducer.

The first clutch and the second clutch may be two-way roller clutches. Namely, the first clutch may be a two-way roller clutch comprising: a cylindrical surface formed on one of the inner periphery of the first output gear and the outer periphery of the output shaft; cam surfaces formed on the other of the inner periphery of the first output gear and the outer periphery of the output shaft; rollers incorporated between the respective cam surfaces and the cylindrical surface; a first retainer retaining the rollers and rotatable relative to the output shaft between the engaged position in which the rollers are engaged between the respective cam surfaces and the cylindrical surface and the neutral position in which the rollers are not engaged between the respective cam surfaces and the cylindrical surface; and a first switch spring biasing the first retainer such that the first retainer is kept in the neutral position. Also, the second clutch may be a two-way roller clutch comprising: a cylindrical surface formed on one of the inner periphery of the second output gear and the outer periphery of the output shaft; cam surfaces formed on the other of the inner periphery of the second output gear and the outer periphery of the output shaft; rollers incorporated between the respective cam surfaces and the cylindrical surface; a second retainer retaining the rollers and rotatable relative to the output shaft between the engaged position in which the rollers are engaged between the respective cam surfaces and the cylindrical surface and the neutral position in which the rollers are not engaged between the respective cam surfaces and the cylindrical surface; and a second switch spring biasing the second retainer such that the second retainer is kept in the neutral position.

In this case, the speed change actuator may comprise: a first friction plate rotationally fixed to the first retainer and movable in an axial direction between a first position where the first friction plate is in contact with the side surface of the first output gear and a second position where the first friction plate is spaced apart from the side surface of the first output gear; a first separation spring biasing the first friction plate toward the second position; a second friction plate rotationally fixed to the second retainer and movable in the axial direction between a third position where the second friction plate is in contact with the side surface of the second output gear and a fourth position where the second friction plate is spaced apart from the side surface of the second output gear; a second separation spring biasing the second friction plate toward the fourth position; a shift ring movable in the axial direction between a first shift position in which the first friction plate is pressed by the shift ring into contact with the side surface of the first output gear and a second shift position in which the second friction plate is pressed by the shift ring into contact with the side surface of the second output gear; and a shift mechanism configured to move the shift ring in the axial direction.

By use of such a speed change actuator, when the shift ring is in the first shift position, the first friction plate is brought into contact with the side surface of the first output gear and rotates relative to the output shaft due to the frictional force between the contacting surfaces of the first friction plate and the first output gear, and the first retainer, which is rotationally fixed to this first friction plate, is moved from the neutral position to the engaged position, so that the first two-way roller clutch is engaged. At this time, since the second friction plate is spaced away from the side surface of the second output gear by the biasing force of the second separation spring, the second retainer is kept in the neutral position by the elastic force of the second switch spring, so that the second two-way roller clutch is disengaged.

When the shift ring is moved in the axial direction from the first shift position toward the second shift position by the shift mechanism, the first friction plate is moved away from the side surface of the first output gear by the biasing force of the first separation spring, so that the friction between the first friction plate and the first output gear is made small. As a result thereof, the first retainer is moved from the engaged position to the neutral position by the elastic force of the first switch spring, so that the first two-way roller clutch is disengaged. When the shift ring reaches the second shift position, the second friction plate is brought into contact with the side surface of the second output gear and rotates relative to the output shaft due to the frictional force between the contacting surfaces of the second friction plate and the second output gear, and the second retainer, which is rotationally fixed to this second friction plate, is moved from the neutral position to the engaged position, so that the second two-way roller clutch is engaged.

Similarly, when the shift ring is moved in the axial direction from the second shift position toward the first shift position by the shift mechanism, the second two-way roller clutch is disengaged and then the first two-way roller clutch is engaged.

The speed reducer may be configured such that the clutches are incorporated in the first input gear and the second input gear, not in the first output gear and the second output gear. Namely, the speed reducer may comprise: an input shaft to which the rotation of the electric motor is input; a first input gear and a second input gear which are provided on the input shaft so as to be rotatable relative to the input shaft; a first clutch incorporated between the first input gear and the input shaft; a second clutch incorporated between the second input gear and the input shaft; a speed change actuator by which either one of the first clutch and the second clutch is selectively engaged; an output shaft arranged so as to be spaced apart from and be in parallel to the input shaft; a first output gear and a second output gear which are provided on the output shaft so as to rotate together with the output shaft and which mesh with the first input gear and the second input gear, respectively; and a differential drive gear through which the rotation of the output shaft is transmitted to the differential.

Furthermore, the first clutch and the second clutch may be two-way roller clutches. Namely, the first clutch may a two-way roller clutch comprising: a cylindrical surface formed on one of the inner periphery of the first input gear and the outer periphery of the input shaft; cam surfaces formed on the other of the inner periphery of the first input gear and the outer periphery of the input shaft; rollers incorporated between the respective cam surfaces and the cylindrical surface; a first retainer retaining the rollers and rotatable relative to the input shaft between the engaged position in which the rollers are engaged between the respective cam surfaces and the cylindrical surface and the neutral position in which the rollers are not engaged between the respective cam surfaces and the cylindrical surface; and a first switch spring biasing the first retainer such that the first retainer is kept in the neutral position. Also, the second clutch may be a two-way roller clutch comprising: a cylindrical surface formed on one of the inner periphery of the second input gear and the outer periphery of the input shaft; cam surfaces formed on the other of the inner periphery of the second input gear and the outer periphery of the input shaft; rollers incorporated between the respective cam surfaces and the cylindrical surface; a second retainer retaining the rollers and rotatable relative to the input shaft between the engaged position in which the rollers are engaged between the respective cam surfaces and the cylindrical surface and the neutral position in which the rollers are not engaged between the respective cam surfaces and the cylindrical surface; and a second switch spring biasing the second retainer such that the second retainer is kept in the neutral position.

In this case, the speed change actuator may comprise: a first friction plate rotationally fixed to the first retainer and movable in an axial direction between a first position where the first friction plate is in contact with the side surface of the first input gear and a second position where the first friction plate is spaced apart from the side surface of the first input gear; a first separation spring biasing the first friction plate toward the second position; a second friction plate rotationally fixed to the second retainer and movable in the axial direction between a third position where the second friction plate is in contact with the side surface of the second input gear and a fourth position where the second friction plate is spaced apart from the side surface of the second input gear; a second separation spring biasing the second friction plate toward the fourth position; a shift ring movable in the axial direction between a first shift position in which the first friction plate is pressed by the shift ring into contact with the side surface of the first input gear and a second shift position in which the second friction plate is pressed by the shift ring into contact with the side surface of the second input gear; and a shift mechanism configured to move the shift ring in the axial direction.

The motor drive assembly according to the present invention is lightweight, and configured such that the tubular, hollow, rotor core mounting portion, of which the "second moment of area" is high, receives moment loads applied between the first bearing and the second bearing supporting the spindle, so that torsional vibration or flexural vibration are less likely to occur in the spindle.

DETAILED DESCRIPTION OF THE INVENTION

Figure 1:
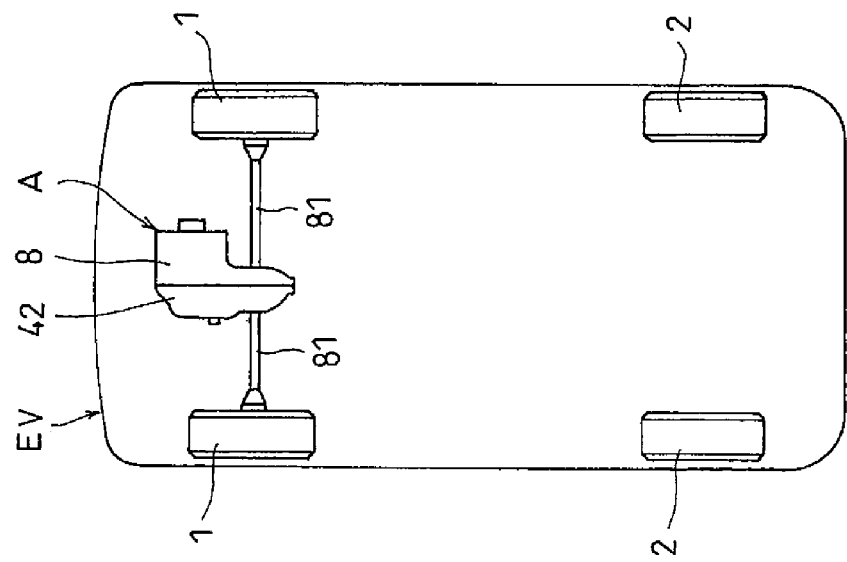
FIG. 1 is a schematic diagram of an electric vehicle in which a motor drive assembly for a vehicle according to the present invention is used.

FIG. 1 illustrates an electric vehicle EV including a motor drive assembly A for a vehicle according to the present invention, a pair of right and left front wheels 1 which are drive wheels driven by the motor drive assembly A, and a pair of right and left rear wheels 2 which are non-drive wheels.

Figure 2:
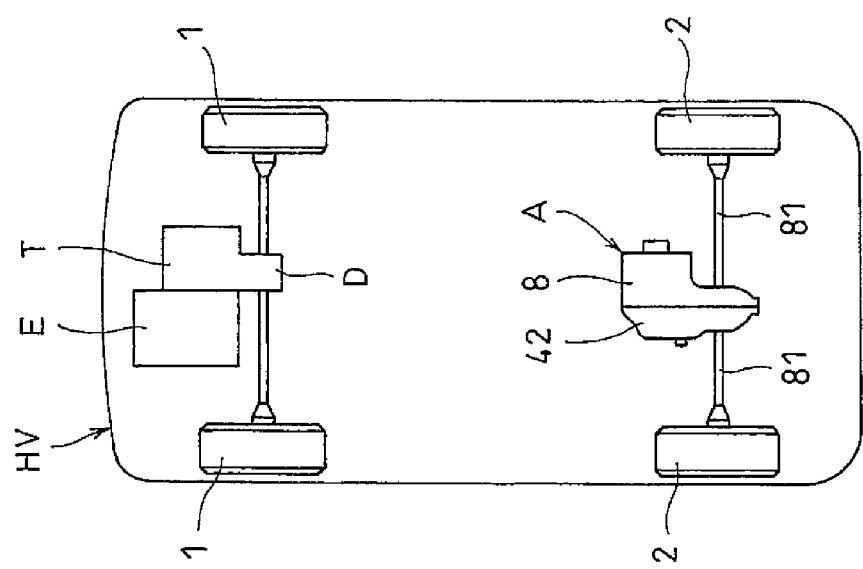
FIG. 2 is a schematic diagram of a hybrid vehicle in which the motor drive assembly according to the present invention is used.

FIG. 2 illustrates a hybrid vehicle HV including an engine E, a pair of right and left front wheels 1, which are main drive wheels driven by the engine E, the motor drive assembly A according to the present invention, and a pair of right and left rear wheels 2, which are auxiliary drive wheels driven by the motor drive assembly A. The hybrid vehicle HV further includes a transmission T which changes the rotation speed of the engine E, and a differential D which distributes the rotation output from the transmission T to the right and left front wheels 1.

The motor drive assembly A according to the present invention is described below, and is incorporated in each of the electric vehicle EV and the hybrid vehicle HV.

Figure 3:
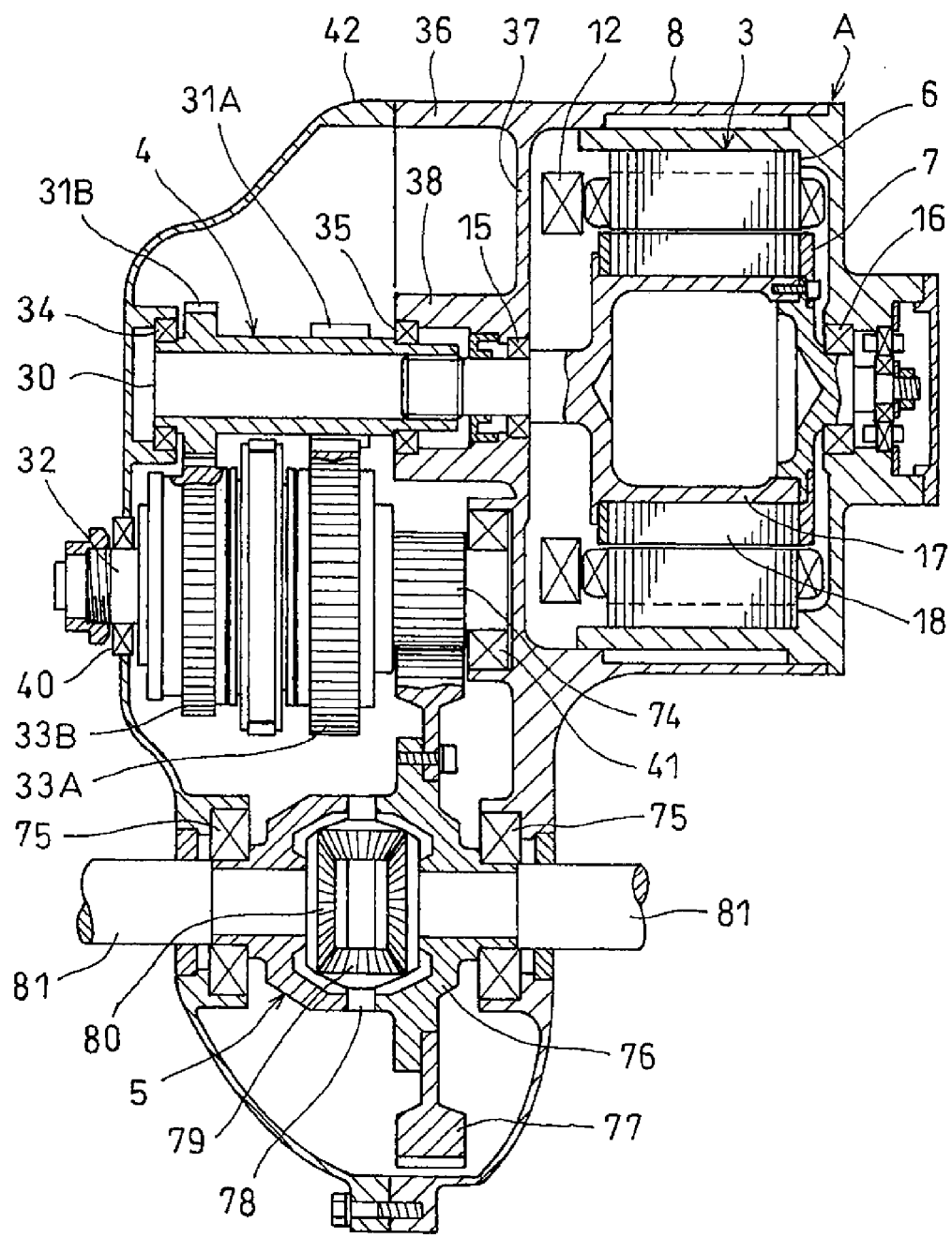
FIG. 3 is a sectional view of the motor drive assembly according to the present invention.

As illustrated in FIG. 3, the motor drive assembly A includes an electric motor 3, a speed reducer 4 which reduces the rotation speed output from the electric motor 3, and a differential 5 which distributes the rotation output from the speed reducer 4 to the pair of right and left front wheels 1 of the electric vehicle EV illustrated in FIG. 1 or to the pair of right and left rear wheels 2 of the hybrid vehicle HV illustrated in FIG. 2.

Figure 4:
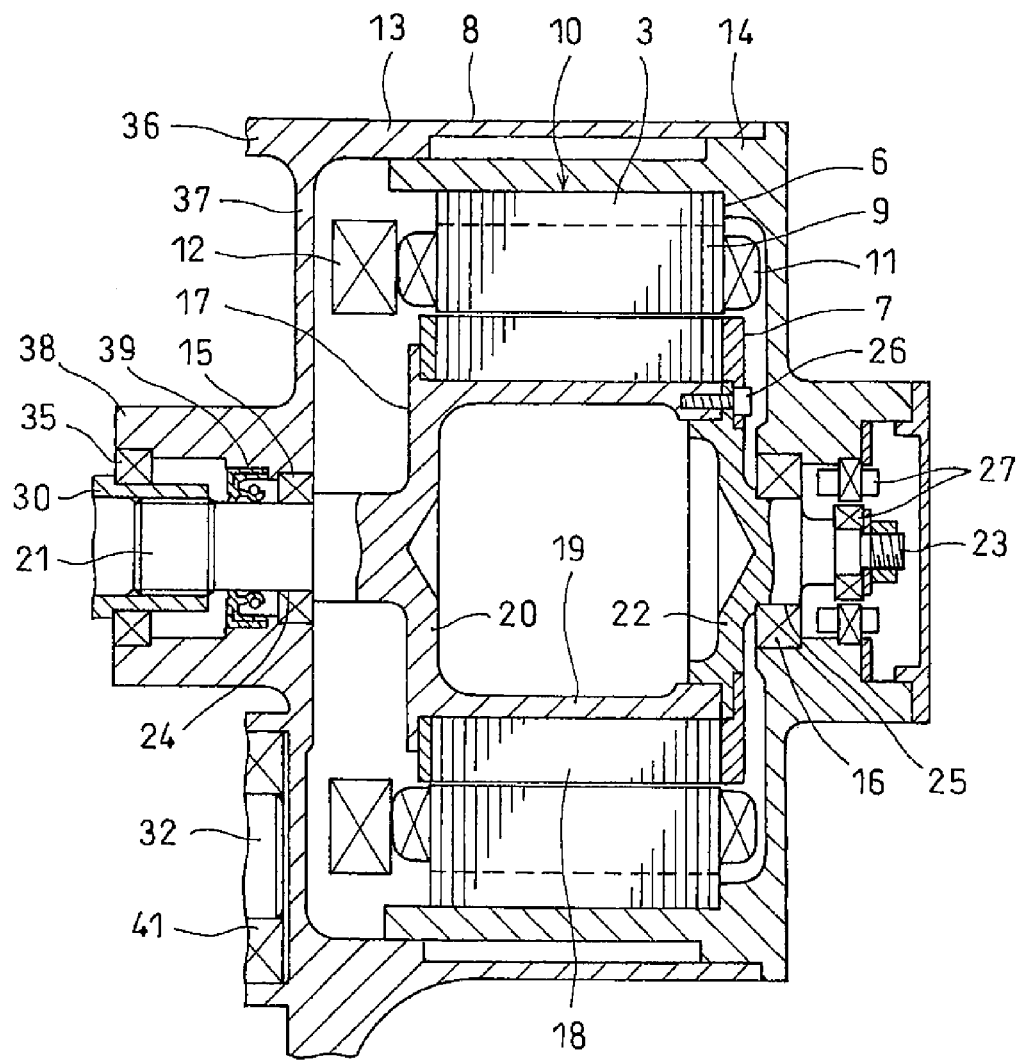
FIG. 4 is an enlarged sectional view of the vicinity of an electric motor illustrated in FIG. 3.

As illustrated in FIG. 4, the electric motor 3 includes an annular stator 6, and a rotor 7 arranged inside of the stator 6. The stator 6 and the rotor 7 are received in a motor housing 8.

The stator 6 includes an annular stator core 10 which has a plurality of teeth 9 arranged circumferentially equidistantly spaced apart from each other so as to surround the rotor 7, electromagnetic coils 11 wound around the respective teeth 9 of the stator core 10, and a coil end 12 circumferentially extending along the axial end surface of the stator core 10 close to the speed reducer 4. The coil end 12 is constituted by a plurality of conducting wires through which electric current is supplied to the electromagnetic coils 11 wound around the respective teeth 9 of the stator core 10. The stator core 10 may be in the form of, for example, electromagnetic steel sheets (e.g. silicon steel sheets) laminated in the axial direction or a member made of magnetic metal powder compressed.

The motor housing 8 includes a front housing member 13 covering the stator 6 of the electric motor 3 on the side of the stator 6 close to the speed reducer 4, and a rear housing member 14 covering the stator 6 of the electric motor 3 on the side of the stator 6 remote from the speed reducer 4. The rear housing member 14 is detachably fixed to the front housing member 13. Since the stator core 10 is fixed to the rear housing member 14 by means of bolts, not shown, when the rear housing member 14 is detached from the front housing member 13, the stator core 10 is also detached together with the rear housing member 14.

The rotor 7 includes a spindle 17 rotatably supported by a first bearing 15 and a second bearing 16 which are arranged so as to be axially spaced apart from each other, and a rotor core 18 mounted on the outer periphery of the spindle 17. The first bearing 15 is a rolling bearing which supports the spindle 17 on the side of the spindle 17 close to the speed reducer 4. The second bearing 16 is a rolling bearing which supports the spindle 17 on the side of the spindle 17 remote from the speed reducer 4. The rotor core 18 receives a rotating force from the stator 6, and may be in the form of, for example, annular electromagnetic steel sheets (e.g. silicon steel sheets) laminated in the axial direction. Alternatively, the rotor core 18 may comprise electromagnetic steel sheets which have respective magnet inserting holes formed therein, and which are laminated in the axial direction, and a permanent magnet embedded in the magnet inserting holes of the thus laminated electromagnetic steel sheets.

The spindle 17 includes a hollow, tubular, rotor core mounting portion 19 having a cylindrical inner peripheral surface, a first shaft portion 21 coupled to an end plate 20 which closes the end portion of the rotor core mounting portion 19 close to the speed reducer 4, and a second shaft portion 23 coupled to an end plate 22 which closes the end portion of the rotor core mounting portion 19 remote from the speed reducer 4. The first shaft portion 21 is formed on its outer periphery with a cylindrical, first bearing fitting surface 24 on which the first bearing 15 is fitted. The second shaft portion 23 is formed on its outer periphery with a cylindrical, second bearing fitting surface 25 on which the second bearing 16 is fitted.

The second shaft portion 23 is formed separately from the rotor core mounting portion 19, and is fixed to the rotor core mounting portion 19 by means of bolts 26. The first shaft portion 21 may also be formed separately from the rotor core mounting portion 19 and fixed to the rotor core mounting portion 19. However, as illustrated in FIG. 4, it is preferable that the first shaft portion 21 and the rotor core mounted portion 19 are integrally formed from a single member. With this arrangement, since there is no joint between the first shaft portion 21 and the rotor core mounting portion 19, through which a rotating force is transmitted from the rotor core 18 to the speed reducer 4, the spindle 17 has high durability.

Generally, the "second moment of area" of a rotating object, which indicates flexural rigidity or torsional rigidity of the rotating object, is given by the total sum of the products of the weights of selected portions of the rotating object and the squared distances between the rotation center of the rotating object and the corresponding selected portions of the rotating member. Therefore, if a hollow rotating object and a solid rotating object have the same weight, the hollow rotating object, in which the distances between respective selected portions of the hollow rotating object and the rotation center of the hollow rotating object are longer, has a second moment of area higher than that of the solid rotating object, in which the distances between respective selected portions of the solid rotating object and the rotation center of the solid rotating object are shorter.

Therefore, the tubular, hollow, rotor core mounting portion 19 has a second moment of area higher than that of a solid rotating member which has the same weight as the rotor core mounting portion 19. If this rotor core mounting portion 19 has an inner diameter larger than at least the diameter of the first bearing fitting surface 24 (namely, the inner diameter of the first bearing 15), it is possible to effectively increase the rigidity of the rotor core mounting portion 19 against flexural loads and torsional loads applied to the rotor core mounting portion 19. Furthermore, if this rotor core mounting portion 19 has an inner diameter larger than the outer diameter of the first bearing 15, it is possible to more effectively increase the rigidity of the rotor core mounting portion 19 against flexural loads and torsional loads applied to the rotor core mounting portion 19.

A rotation sensor 27 which detects the rotation speed of the spindle 17 is mounted on the second shaft portion 23 of the spindle 17. The rotation sensor 27 is connected to a controlling device (not illustrated in the drawings) for the electric motor 3. The controlling device controls the voltage to be supplied to the electromagnetic coils 11 of the stator 6 based on the output signal of the rotation sensor 27. The rotation sensor 27 may be, for example, a resolver. In order to minimize the distance between the first bearing 15 and the second bearing 16, thereby maximizing the rigidity of the spindle 17, the rotation sensor 27 is provided at a position closer to the axial end of the second shaft portion 23 than is the second bearing 16.

As illustrated in FIG. 3, the speed reducer 4 includes an input shaft 30 to which the rotation of the rotor 7 of the electric motor 3 is input, a first-speed input gear 31A and a second-speed input gear 31B which are provided on the input shaft 30 so as to rotate together with the input shaft 30, an output shaft 32 arranged so as to be spaced apart from and be in parallel to the input shaft 30, and a first-speed output gear 33A and a second-speed output gear 33B which are provided on the output shaft 32 so as to be rotatable relative to the output shaft 32.

The input shaft 30 is arranged coaxially with the spindle 17 of the electric motor 3 so as to be in series with the spindle 17, and rotatably supported by a pair of rolling bearings 34, 35 arranged so as to be axially spaced apart from each other. One axial end of the input shaft 30 is connected to one axial end of the first shaft portion 21 of the spindle 17 so that the spindle 17 and the input shaft 30 rotate together. The axial ends of the input shaft 30 and the first shaft portion 21 may be connected together, for example, by means of a spline.

The front housing member 13 includes an outer shell portion 36 surrounding the outer periphery of the stator 6, a partition wall portion 37 which partitions the interior of the outer shell portion 36 between the stator 6 and the speed reducer 4, and a tubular boss 38 integral with the partition wall 37 and surrounding the first shaft portion 21 of the spindle 17.

As illustrated in FIG. 4, the first bearing 15, which supports the first shaft portion 21 of the spindle 17, and the bearing 35, i.e. one of the two rolling bearings 34, 35 (which support the input shaft 30) that is located closer to the electric motor 3 are incorporated inside the inner periphery of the boss 38 so as to be coaxial with and axially spaced apart from each other. An oil seal 39 is incorporated between the first bearing 15 and the rolling bearing 35 so as to be in sliding contact with the outer periphery of the first shaft portion 21 of the spindle 17.

As illustrated in FIG. 3, the output shaft 32 is rotatably supported by a pair of rolling bearings 40, 41 arranged so as to be axially spaced apart from each other. Of the rolling bearings 40 and 41, the rolling bearing 41, which is located closer to the electric motor 3, is incorporated in the motor housing 8, and the rolling bearing 40, which is remote from the electric motor 3, is incorporated in a speed reducer housing 42 in which the speed reducer 4 is received. The motor housing 8 and the speed reducer housing 42 are brought into abutment with each other and fastened together by means of bolts, not shown.

The first-speed input gear 31A and the second-speed input gear 31B are arranged so as to be axially spaced apart from each other, and are fixed to the input shaft 30 so as to rotate together with the input shaft 30. The first-speed output gear 33A and the second-speed output gear 33B are also arranged so as to be axially spaced apart from each other.

Figure 6:
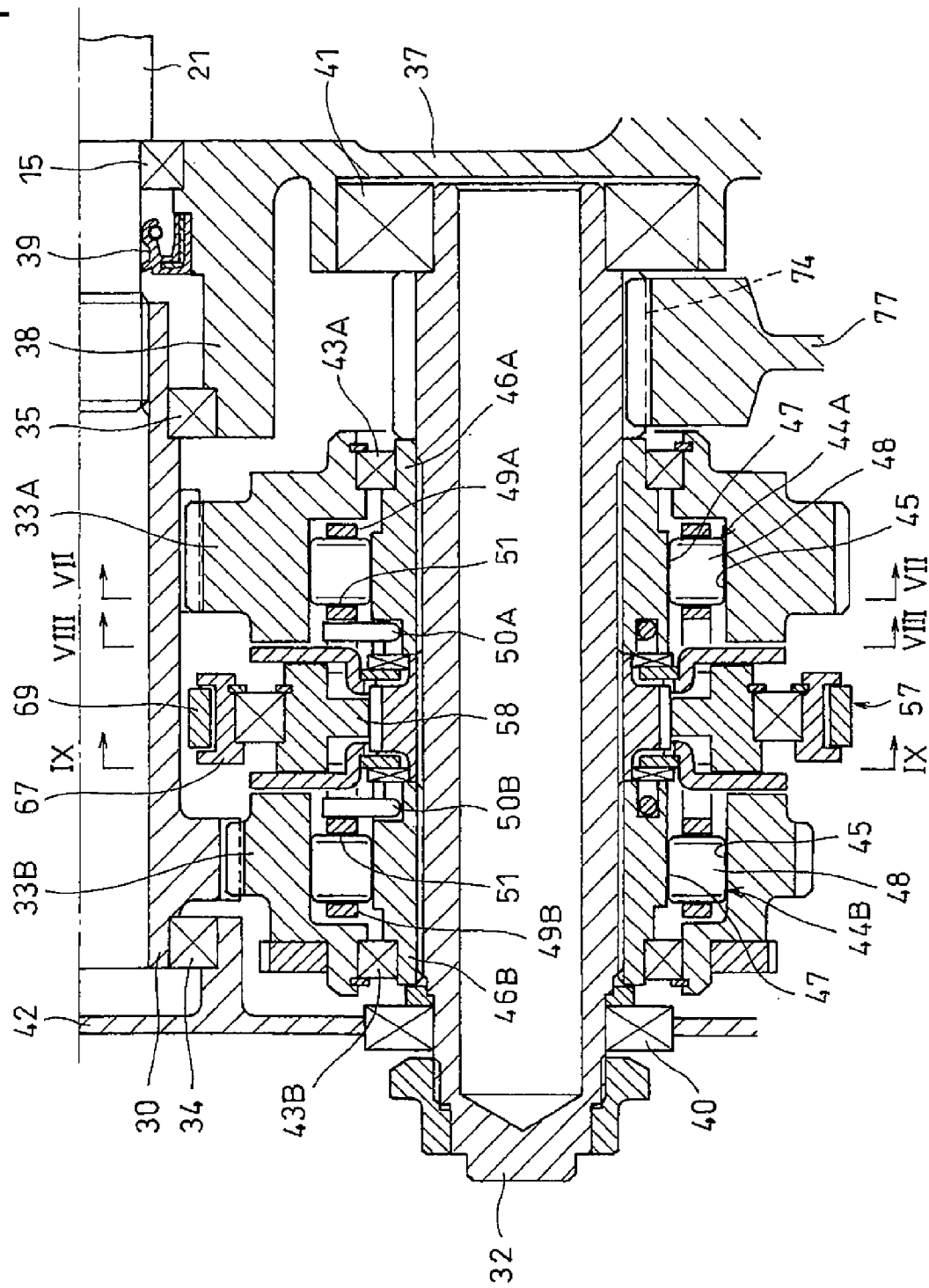
FIG. 6 is an enlarged sectional view of the vicinity of an output shaft illustrated in FIG. 3.

As illustrated in FIG. 6, the first-speed output gear 33A is an annular member through which the output shaft 32 extends, and is supported by the output shaft 32 through a rolling bearing 43A so as to be rotatable about and relative to the output shaft 32. Similarly, the second-speed output gear 33B is also rotatably supported by the output shaft 32 through a rolling bearing 43B.

The first-speed input gear 31A and the first-speed output gear 33A mesh with each other so that rotation is transmitted between the first-speed input gear 31A and the first-speed output gear 33A. The second-speed input gear 31B and the second-speed output gear 33B also mesh with each other so that rotation is transmitted between the second-speed input gear 31B and the second-speed output gear 33B. The speed reduction ratio between the second-speed input gear 31B and the second-speed output gear 33B is smaller than the speed reduction ratio between the first-speed input gear 31A and the first-speed output gear 33A.

A first-speed two-way roller clutch 44A is incorporated between the first-speed output gear 33A and the output shaft 32. The first-speed two-way roller clutch 44A selectively transmits torque or stops the transmission of torque between the first-speed output gear 33A and the output shaft 32. While the first-speed two-way roller clutch 44A is engaged, torque in either normal or reverse direction is transmitted from one to the other shaft, whereas while the first-speed two-way roller clutch 44A is disengaged, torque in either direction is not transmitted to the other shaft, so that the one shaft rotates alone. Similarly, a second-speed two-way roller clutch 44B is incorporated between the second-speed output gear 33B and the output shaft 32. The second-speed two-way roller clutch 44B also selectively transmits torque or stops the transmission of torque between the second-speed output gear 33B and the output shaft 32.

The first-speed two-way roller clutch 44A and the second-speed two-way roller clutch 44B are identical in structure to each other, and are arranged so as to form horizontal mirror images of each other. Therefore, only the first-speed two-way roller clutch 44A is described below, and the description of the second-speed two-way roller clutch 44B is omitted, while using identical numerals or numerals identical except that the letter "B" is used at the end instead of the letter "A" for elements corresponding to those of the first-speed two-way roller clutch 44A.

Figure 7:
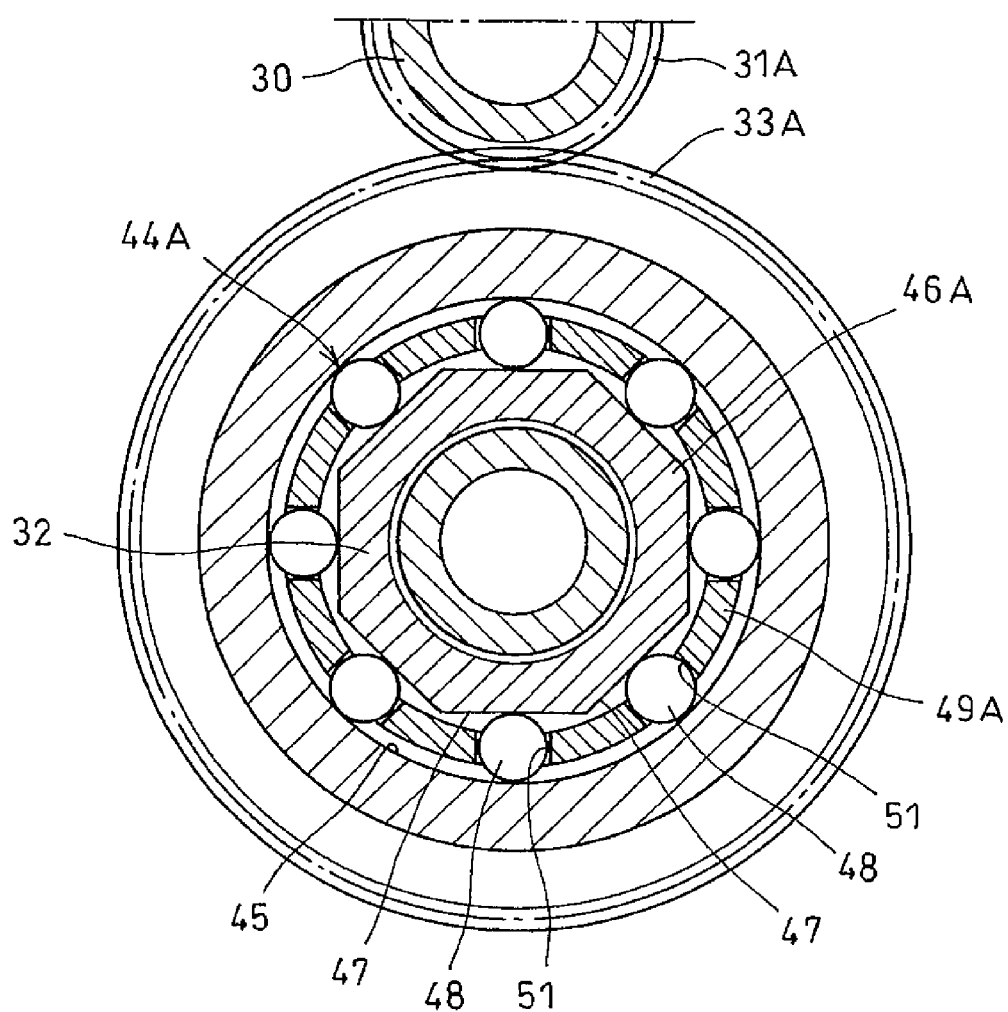
FIG. 7 is a sectional view taken along the line VII-VII of FIG. 6.
Figure 8:
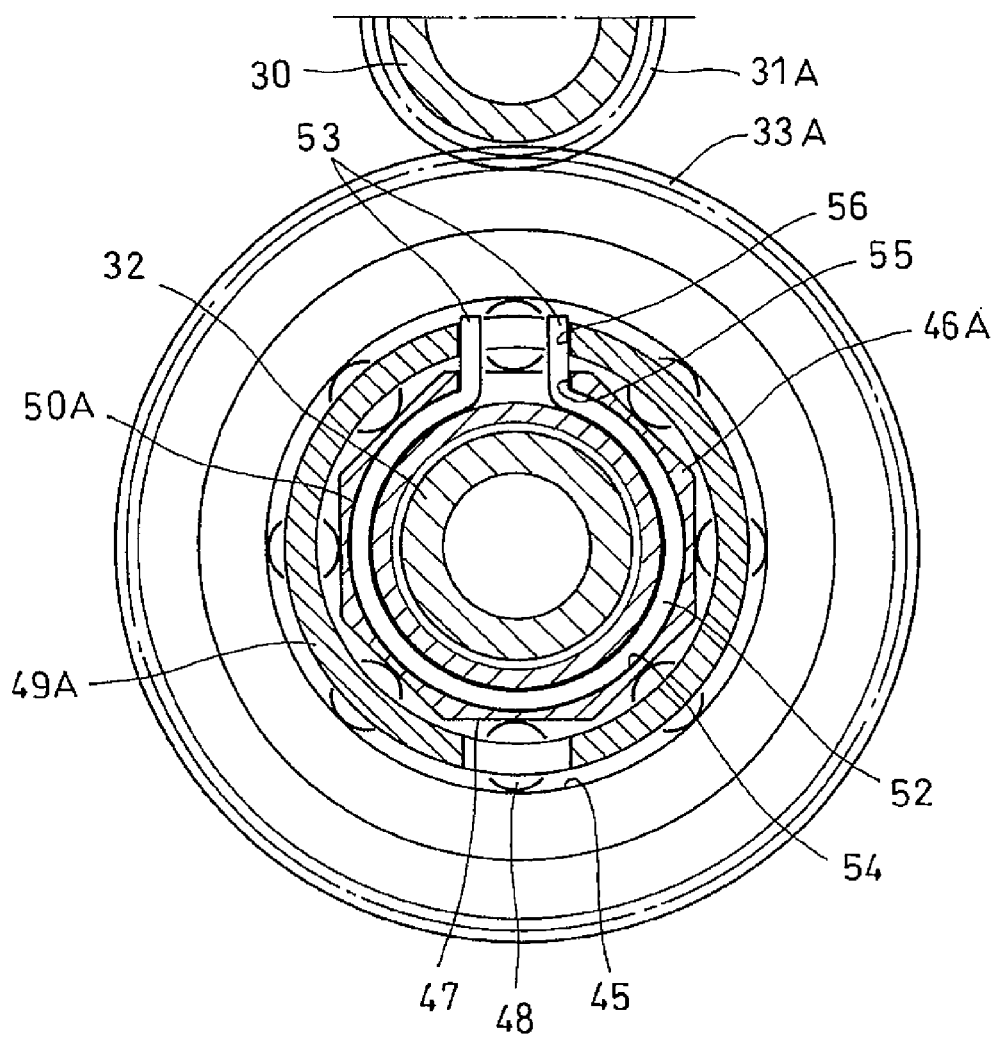
FIG. 8 is a sectional view taken along the line VIII-VIII of FIG. 6.

As illustrated in FIGS. 6 to 8, the first-speed two-way roller clutch 44A includes a cylindrical surface 45 formed on the inner periphery of the first-speed output gear 33A, cam surfaces 47 formed on an annular first-speed cam member 46A rotationally fixed to the outer periphery of the output shaft 32, rollers 48 incorporated between the cylindrical surface 45 and the respective cam surfaces 47, a first-speed retainer 49A retaining the rollers 48, and a first-speed switch spring 50A. Each of the cam surfaces 47 and the cylindrical surface 45 define therebetween a wedge-shaped space which becomes narrow from the circumferential center of the space toward the respective circumferential ends of the space. For example, as illustrated in FIG. 7, the cam surfaces 47 are flat surfaces radially facing the cylindrical surface 45.

As illustrated in FIG. 7, the first-speed retainer 49A is a cylindrical member having a plurality of pockets 51 circumferentially spaced apart from each other. The rollers 48 are received in the respective pockets 51. The first-speed retainer 49A is rotatable relative to the output shaft 32 between the engaged position in which the rollers 48 are engaged between the respective cam surfaces 47 and the cylindrical surface 45 and the neutral position in which the rollers 48 are not engaged between the respective cam surfaces 47 and the cylindrical surface 45.

As illustrated in FIG. 8, the first-speed switch spring 50A includes a C-shaped annular portion 52 formed by bending a steel wire until the steel wire becomes C-shaped, and a pair of extensions 53 which extend radially outwardly from the respective ends of the C-shaped annular portion 52. The C-shaped annular portion 52 is fitted in a circular switch spring receiving recess 54 formed in the axial end surface of the first-speed cam member 46A. The pair of extensions 53 are inserted in a radial groove 55 formed in the axial end surface of the first-speed cam member 46A.

The radial groove 55 is formed to extend radially outwardly from the inner peripheral surface of the switch spring receiving recess 54 to the outer periphery of the first-speed cam member 46A. The extensions 53 of the first-speed switch spring 50A protrude from the radially outer end of the radial groove 55, and the portions of the extensions 53 protruding from the radial groove 55 are inserted in a cutout 56 formed in the axial end portion of the first-speed retainer 49A. The radial groove 55 and the cutout 56 are equal in width to each other.

The extensions 53 are in contact with the circumferentially opposed inner surfaces of the radial groove 55 and the circumferentially opposed inner surfaces of the cutout 56, thereby circumferentially biasing the first-speed retainer 49A such that the first-speed retainer 49A is elastically kept in the neutral position by circumferential forces which act on the contacting surfaces.

When the first-speed retainer 49A is rotated relative to the output shaft 32 and thus circumferentially moved from the neutral position illustrated in FIG. 8, the cutout 56 is circumferentially displaced from the position of the radial groove 55. As a result thereof, the C-shaped annular portion 52 is elastically deformed such that the distance between the pair of extensions 53 becomes short, and thus the pair of extensions 53 of the first-speed switch spring 50A press one of the inner surfaces of the radial groove 55 and one of the inner surfaces of the cutout 56, respectively, by the elastic restoring force of the C-shaped annular portion 52, thereby circumferentially biasing the first-speed retainer 49A toward the neutral position.

Either one of the first-speed two-way roller clutch 44A and the second-speed two-way roller clutch 44B can be selectively engaged by a speed change actuator 57.

Figure 11:
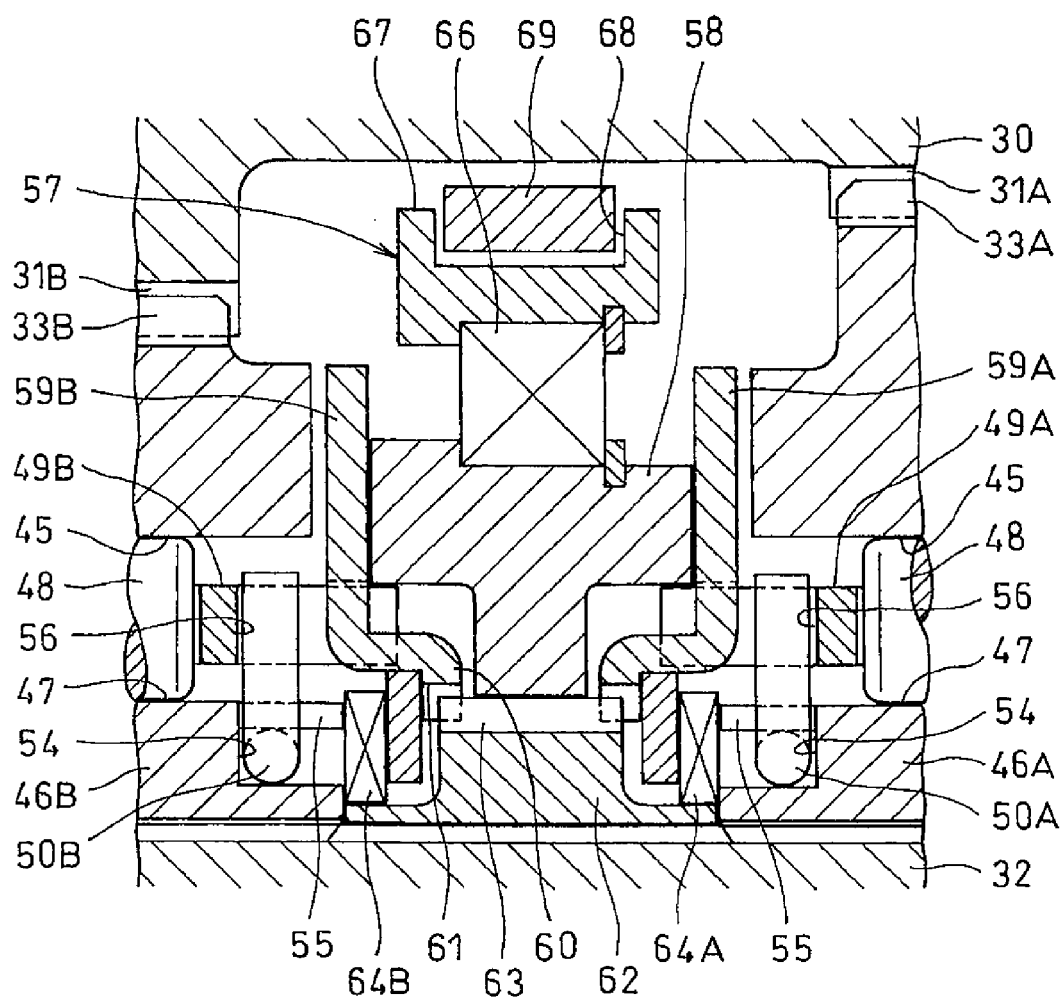
FIG. 11 is an enlarged sectional view of the vicinity of the shift ring illustrated in FIG. 6.

As illustrated in FIG. 11, the speed change actuator 57 includes a shift ring 58 provided between the first-speed output gear 33A and the second-speed output gear 33B so as to be movable in the axial direction, a first-speed friction plate 59A incorporated between the first-speed output gear 33A and the shift ring 58, and a second-speed friction plate 59B incorporated between the second-speed output gear 33B and the shift ring 58.

The first-speed friction plate 59A and the second-speed friction plate 59B are identical in structure to each other, and are arranged to form horizontal mirror images of each other. Therefore, only the second-speed friction plate 59B is described below, and the description of the first-speed friction plate 59A is omitted, while using identical numerals or numerals identical except that the letter "A" is used at the end instead of the letter "B" for elements corresponding to the second-speed friction plate 59B.

The second-speed friction plate 59B is formed with protruding pieces 60 (see FIG. 9) which engage in respective cutouts 56 of a second-speed retainer 49B, thereby rotationally fixing the second-speed friction plate 59B to the second-speed retainer 49B. The protruding pieces 60 of the second-speed friction plate 59B are received in the respective cutouts 56 of the second-speed retainer 49B so as to be slidable in the axial direction. Therefore, with the second-speed friction retainer 59B rotationally fixed to the second-speed retainer 49B, the second-speed friction plate 59B is movable in the axial direction relative to the second-speed retainer 49B so as to contact or move away from the side surface of the second-speed output gear 33B.

The protruding pieces 60 of the second-speed friction plate 59B are formed at the distal ends thereof with recesses 61, respectively. A spacer 62 fixed to the outer periphery of the output shaft 32 is formed with protrusions 63. The recesses 61 and the protrusions 63 are arranged such that while the second-speed friction plate 59B is spaced apart from the side surface of the second-speed output gear 33B, the protrusions 63 are engaged in the respective recesses 61, so that the second-speed friction plate 59B is rotationally fixed to the output shaft 32 through the spacer 62. At this time, the second-speed retainer 49B, which is rotationally fixed to the second-speed friction plate 59B, is kept in the neutral position. Also, while the second-speed friction plate 59B is in contact with the side surface of the second-speed output gear 33B, the protrusions 63 are not engaged in the respective recesses 61, so that the second-speed friction plate 59B is not rotationally fixed to the output shaft 32.

A second-speed separation spring 64B is incorporated between the second-speed friction plate 59B and the second-speed cam member 46B while being compressed in the axial direction. The second-speed friction plate 59B is biased by the elastic restoring force of the second-speed separation spring 64B in the direction away from the side surface of the second-speed output gear 33B.

The shift ring 58 is supported so as to be movable in the axial direction between a first-speed shift position and a second-speed shift position. In the first-speed shift position, the first-speed friction plate 59A is pressed by the shift ring 58 into contact with the side surface of the first-speed output gear 33A. In the second-speed shift position, the second-speed friction plate 59B is pressed by the shift ring 58 into contact with the side surface of the second-speed output gear 33B. The shift ring 58 is axially moved between the first-speed shift position and the second-speed shift position by a shift mechanism 65.

Figure 9:
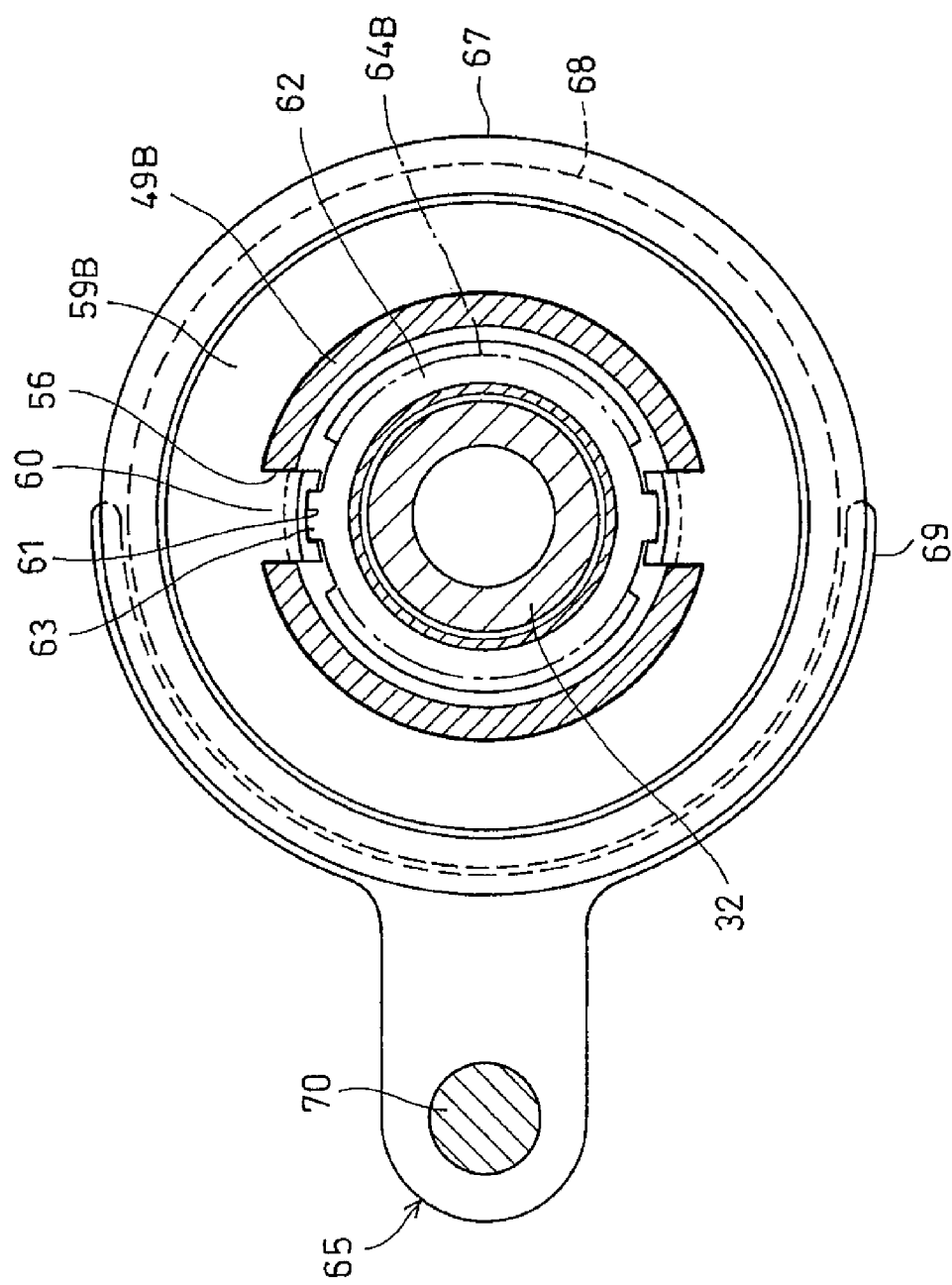
FIG. 9 is a sectional view taken along the line IX-IX of FIG. 6.
Figure 10:
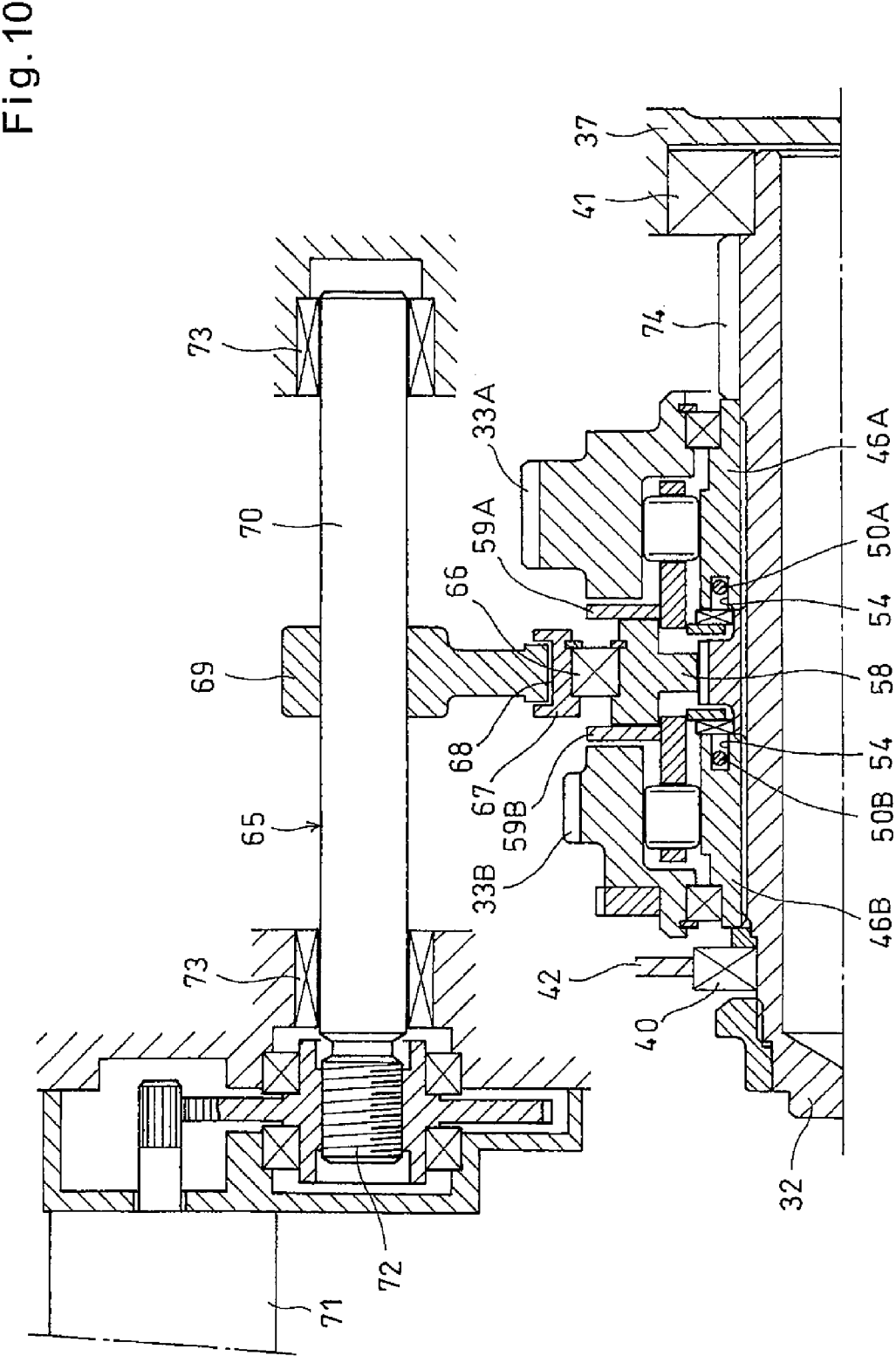
FIG. 10 is a sectional view of a shift mechanism which axially moves a shift ring illustrated in FIG. 6.

As illustrated in FIGS. 9 and 10, the shift mechanism 65 includes a shift sleeve 67 rotatably supporting the shift ring 58 through a rolling bearing 66, a bifurcated shift fork 69 which engages in an annular groove 68 formed on the outer periphery of the shift sleeve 67, a shift rod 70 to which the shift fork 69 is fixed, a shift motor 71, and a motion converter 72 (such as a feed screw mechanism) which converts the rotation of the shift motor 71 to the linear motion of the shift rod 70.

As illustrated in FIG. 10, the shift rod 70 is arranged so as to be spaced apart from and be in parallel to the output shaft 32, and is supported by a pair of slide bearings 73 incorporated in the speed reducer housing 42, so as to be slidable in the axial direction. The rolling bearing 66, which is incorporated between the shift ring 58 and the shift sleeve 67, is not movable in the axial direction relative to both the shift ring 58 and the shift sleeve 67.

In this shift mechanism 65, the rotation of the shift motor 71 is converted to a linear motion by the motion converter 72, the linear motion is transmitted to the shift fork 69, and the linear motion of the shift fork 69 is transmitted to the shift ring 58 through the rolling bearing 66, thereby moving the shift ring 58 in the axial direction.

As illustrated in FIG. 3, the output shaft 32 has a differential drive gear 74 fixed thereto through which the rotation of the output shaft 32 is transmitted to the differential 5.

The differential 5 includes a differential case 76 rotatably supported by a pair of bearings 75 arranged so as to be axially spaced apart from each other, a ring gear 77 which is fixed to the differential case 76 so as to be coaxial with the rotation axis of the differential case 76 and which meshes with the differential drive gear 74, a pinion shaft 78 fixed to the differential case 76 to extend in a direction perpendicular to the rotation axis of the differential case 76, a pair of pinions 79 rotatably supported by the pinion shaft 78, and a pair of right and left side gears 80 which mesh with the pair of pinions 79. An axle 81 connected to the left vehicle wheel is connected at its axial end to the left side gear 80, while an axle 81 connected to the right vehicle wheel is connected at its axial end to the right side gear 80. When the output shaft 32 rotates, the rotation of the output shaft 32 is transmitted to the differential case 76 through the differential drive gear 74, and then the rotation of the differential case 76 is distributed to the right and left vehicle wheels through the pinions 79 and the side gears 80.

It is described below how the motor drive assembly A operates.

As illustrated in FIG. 11, while the first-speed friction plate 59A is spaced apart from the side surface of the first-speed output gear 33A and the second-speed friction plate 59B is also spaced apart from the side surface of the second-speed output gear 33B, the first-speed retainer 49A is kept in the neutral position by the spring force of the first-speed switch spring 50A, and the second-speed retainer 49B is also kept in the neutral position by the spring force of a second-speed switch spring 50B. Therefore, the rollers 48 of the first-speed two-way roller clutch 44A are not engaged, and rollers 48 of the second-speed two-way roller clutch 44B are also not engaged.

In this state, since neither of the first-speed two-way roller clutch 44A and the second-speed two-way roller clutch 44B is engaged, when the motor shaft of the electric motor 3 illustrated in FIG. 3 rotates and then the input shaft 30 is rotated, the rotation of the input shaft 30 is transmitted only to the first-speed output gear 33A and the second-speed output gear 33B, and not to the output shaft 32.

Figure 12:
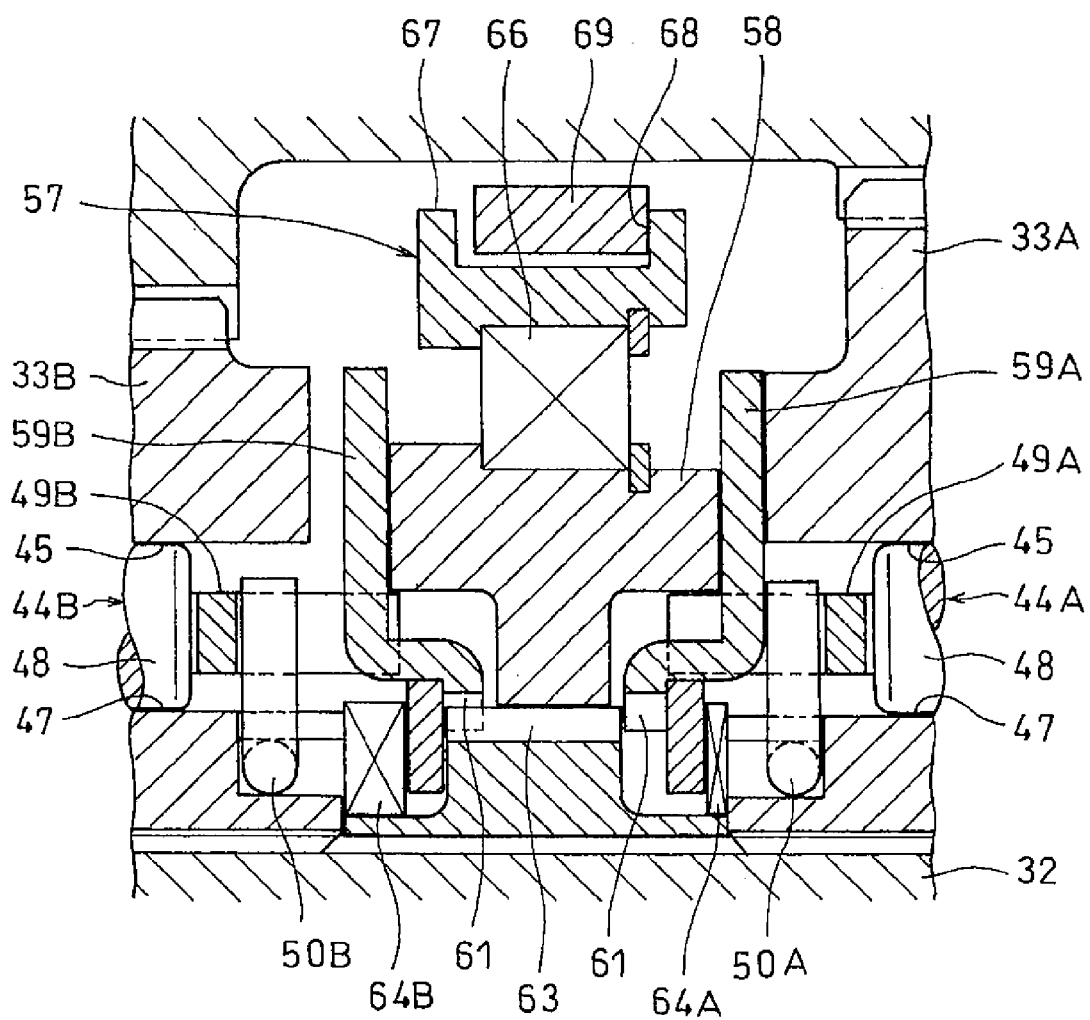
FIG. 12 is an enlarged sectional view of the shift ring illustrated in FIG. 11, which is moved to a first-speed shift position.
Figure 13:
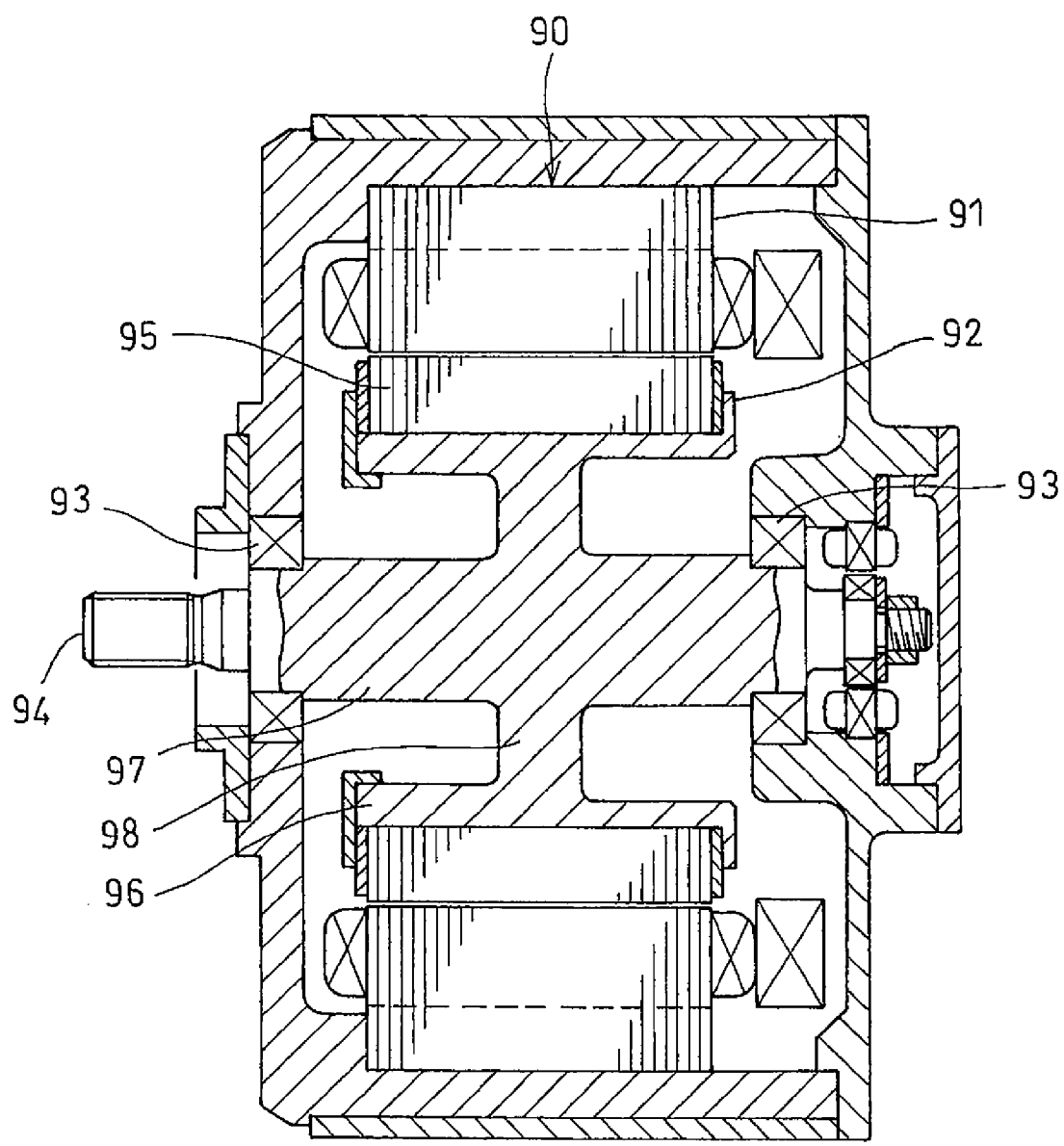
FIG. 13 is a sectional view of another electric motor illustrated as a reference example.

When the shift ring 58 is moved from the position shown in FIG. 11 toward the first-speed output gear 33A by the shift mechanism 65, as illustrated in FIG. 12, the first-speed friction plate 59A is brought into contact with the side surface of the first-speed output gear 33A, and rotates relative to the output shaft 32 due to the frictional force between the contacting surfaces of the friction plate 59A and the output gear 33A. Therefore, the first-speed retainer 49A, which is rotationally fixed to the first-speed friction plate 59A, is moved from the neutral position to the engaged position, and thus the rollers 48, which are retained by the first-speed retainer 49A, are each pushed into a narrow portion of the wedge-shaped space between the cylindrical surface 45 and the corresponding cam surface 47. As a result thereof, the first-speed two-way roller clutch 44A is engaged.

In this state, the rotation of the first-speed output gear 33A is transmitted to the output shaft 32 through the first-speed two-way roller clutch 44A, and then the rotation of the output shaft 32 is transmitted to the axles 81 through the differential 5. As a result thereof, in the electric vehicle EV illustrated in FIG. 1, the front wheels 1, which are drive wheels, are driven, and in the hybrid vehicle HV illustrated in FIG. 2, the rear wheels 2, which are auxiliary drive wheels, are driven.

When the shift ring 58 is moved in the axial direction from the first-speed shift position toward the second-speed shift position by the shift mechanism 65, the frictional force between the contacting surfaces of the first-speed friction plate 59A and the first-speed output gear 33A becomes small. Therefore, the first-speed retainer 49A is moved from the engaged position to the neutral position by the spring force of the first-speed switch spring 50A. As a result thereof, the first-speed two-way roller clutch 44A is disengaged.

When the shift ring 58 reaches the second-speed shift position, the second-speed friction plate 59B is pressed by the shift ring 58 into contact with the side surface of the second-speed output gear 33B. Therefore, the second-speed friction plate 59B rotates relative to the output shaft 32 due to the frictional force between the contacting surfaces of the friction plate 59B and the output gear 33B, and the second-speed retainer 49B, which is rotationally fixed to the second-speed friction plate 59B, is moved from the neutral position to the engaged position. As a result thereof, the second-speed two-way roller clutch 44B is engaged.

In this state, the rotation of the second-speed output gear 33B is transmitted to the output shaft 32 through the second-speed two-way roller clutch 44B, and then the rotation of the output shaft 32 is transmitted to the axles 81 through the differential 5.

Similarly, by axially moving the shift ring 58 from the second-speed shift position to the first-speed shift position, it is possible to disengage the second-speed two-way roller clutch 44B and engage the first-speed two-way roller clutch 44A.

By use of this motor drive assembly A, it is possible to use the optimum speed reduction ratio of the speed reducer 4 according to the travel speed of the vehicle, and thus to use the electric motor 3 in the rotation range in which energy efficiency is high. As a result thereof, it is possible to use a small-sized motor as the electric motor 3, and thus to effectively lighten the motor drive assembly A.

In the spindle 17 used in the electric motor 3 of this motor drive assembly A, since the rotor core mounting portion 19 is a tubular hollow portion, it is possible to obtain a high "second moment of area" even though the spindle 17 is lightweight. Also, since the rotor core mounting portion 19, of which the second moment of area is high, receives moment loads applied between the first bearing 15 and the second bearing 16 supporting the spindle 17, torsional vibration or flexural vibration are less likely to occur in the spindle 17. As a result thereof, it is possible to prevent vibration of the electric motor 3 or abnormal noise from the electric motor 3, while the electric motor 3 is rotating at a low speed.

In the above-described embodiment, as illustrated in FIG. 4, the rotor core mounting portion 19 of the spindle 17 has its both ends closed. However, as illustrated in FIG. 5, the spindle 17 may be configured such that the rotor core mounting portion 19 has an open end portion on the side of the rotor core mounting portion 19 remote from the speed reducer 4, and such that the rotor core mounting portion 19 is formed on its inner periphery with a cylindrical surface 82 on which the second bearing 16 is fitted.

In this arrangement, since the second bearing 16, which supports the spindle 17, is arranged inside of the tubular, hollow, rotor core mounting portion 19, the distance between the first bearing 15 and the second bearing 16, which support the spindle 17, is short compared to the arrangement illustrated in FIG. 4, in which the second bearing 16 is arranged outside of the rotor core mounting portion 19. As a result thereof, it is possible to effectively restrain the vibration of the spindle 17.

Figure 5:
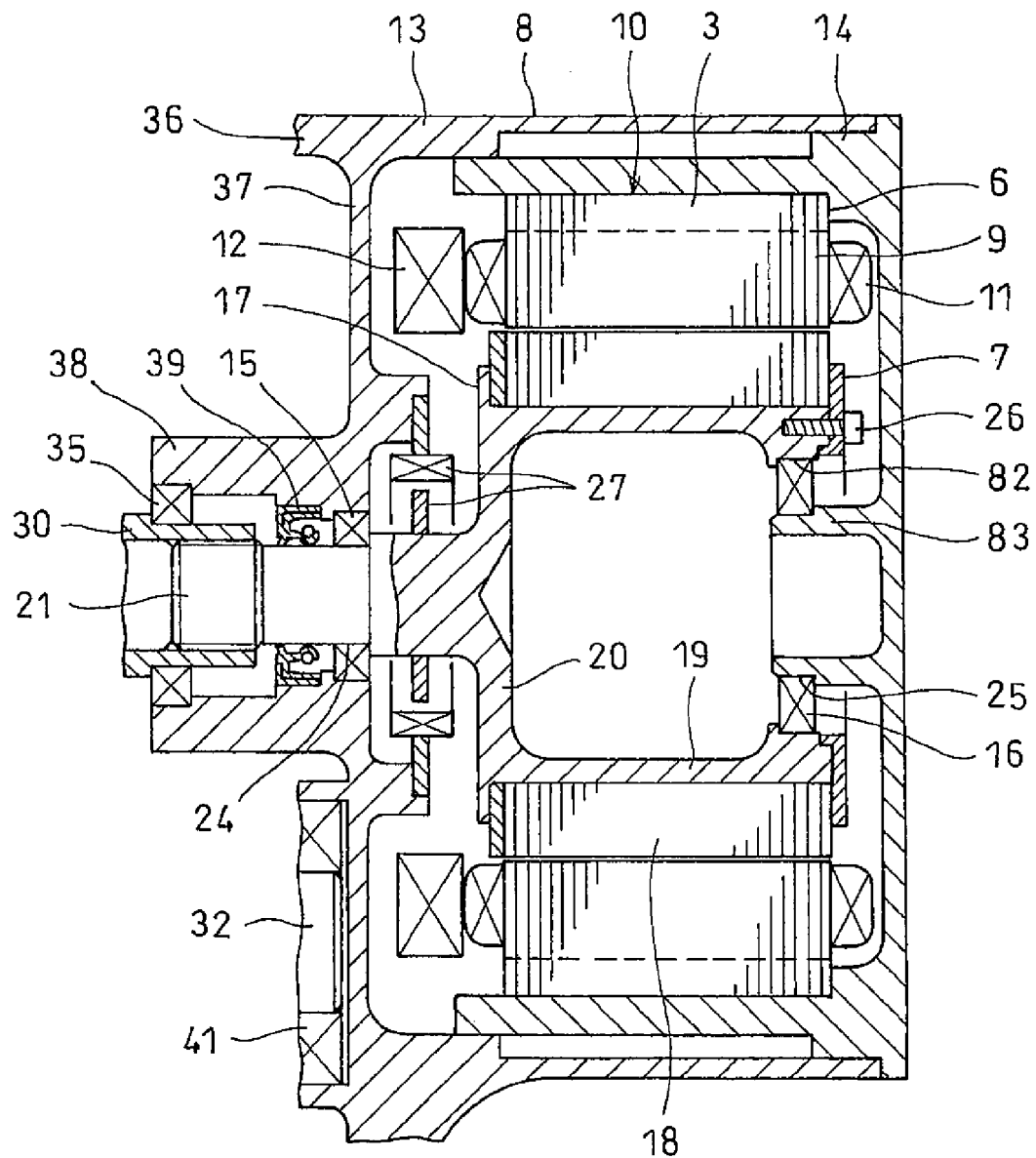
FIG. 5 is an enlarged sectional view illustrating another example of an electric motor illustrated in FIG. 4.

In FIG. 5, the spindle 17 includes a tubular, hollow, rotor core mounting portion 19, and a first shaft portion 21 coupled to an end plate 20 closing the end portion of the rotor core mounting portion 19 close to the speed reducer 4. The first shaft portion 21 has on its outer periphery a cylindrical, first bearing fitting surface 24 on which a first bearing 15 is fitted, whereas a cylindrical surface 82 on which the second bearing 16 is fitted is formed on the inner periphery of the end portion of the rotor core mounting portion 19 remote from the speed reducer 4.

A rotation sensor 27 which detects the rotation speed of the spindle 17 is mounted on the outer periphery of the first shaft portion 21. The rotation sensor 27 is radially aligned with the coil end 12 of the stator 6 so that the axial length of the electric motor 3 is made short. As in the above-described embodiment, the rotation sensor 27 is connected to the controlling device (not illustrated in the drawings) of the electric motor 3, and voltage to be supplied to the electromagnetic coils 11 of the stator 6 is controlled by the controlling device based on the output signal of this rotation sensor 27. The rotation sensor 27 may be, for example, a resolver.

The second bearing 16 is mounted on the outer periphery of a housing shaft 83 provided in the rear housing 14. The housing shaft 83 is a hollow shaft for reduced weight, and is formed on its outer periphery with a cylindrical second bearing fitting surface 25 on which the second bearing 16 is fitted.

In the speed reducer 4 of the above-described embodiment, the first-speed two-way roller clutch 44A is incorporated in the first-speed output gear 33A, and the second-speed two-way roller clutch 44B is incorporated in the second-speed output gear 33B. However, the speed reducer 4 may be configured such that the first-speed two-way roller clutch 44A is incorporated in the first-speed input gear, not in the first-speed output gear, and the second-speed two-way roller clutch 44B is incorporated in the second-speed input gear, not in the second-speed output gear.

In particular, such a speed reducer 4 may include an input shaft 30 to which the rotation of the electric motor 3 is input, a first-speed input gear 31A and a second-speed input gear 31B which are provided on the input shaft 30 so as to be rotatable relative to the input shaft 30, a first-speed two-way roller clutch 44A incorporated between the first-speed input gear 31A and the input shaft 30, a second-speed two-way roller clutch 44B incorporated between the second-speed input gear 31B and the input shaft 30, a speed change actuator 57 by which either one of the first-speed two-way roller clutch 44A and the second-speed two-way roller clutch 44B is selectively engaged, an output shaft 32 arranged so as to be spaced apart from and be in parallel to the input shaft 30, a first-speed output gear 33A and a second-speed output gear 33B which are provided on the output shaft 32 so as to rotate together with the output shaft 32, and which mesh with the first-speed input gear 31A and the second-speed input gear 31B, respectively, and a differential drive gear 74 through which the rotation of the output shaft 32 is transmitted to the differential 5.

The invention claimed is:
1. A motor drive assembly for a vehicle, comprising:
an electric motor including an annular stator and a rotor configured to rotate inside of the stator;
a speed reducer configured to reduce a rotation speed output from the electric motor; and
a differential configured to distribute a rotation output from the speed reducer to right and left vehicle wheels,
wherein the rotor of the electric motor comprises a first bearing located on a first side of the rotor close to the speed reducer, a second bearing located on a second side of the rotor opposite from the first side of the rotor and remote from the speed reducer, a spindle rotatably supported by the first bearing and the second bearing, and a rotor core mounted on an outer periphery of the spindle and configured to receive a rotating force from the stator,
wherein the spindle comprises a first shaft portion having, on an outer periphery thereof, a cylindrical first bearing fitting surface on which the first bearing is fitted, a tubular, hollow, rotor core mounting portion having an inner diameter larger than a diameter of the first bearing fitting surface, and an end plate closing an end portion of the rotor core mounting portion on a first side of the rotor core mounting portion close to the speed reducer,
wherein the first shaft portion is coupled to the end plate, and
wherein the speed reducer comprises:
an input shaft to which a rotation of the electric motor is input;
a first input gear and a second input gear which are provided on the input shaft so as to rotate together with the input shaft;
an output shaft arranged so as to be spaced apart from and be in parallel to the input shaft;
a first output gear and a second output gear which are provided on the output shaft so as to be rotatable relative to the output shaft and which mesh with the first input gear and the second input gear, respectively;
a first clutch incorporated between the first output gear and the output shaft;
a second clutch incorporated between the second output gear and the output shaft;
a speed change actuator by which either one of the first clutch and the second clutch is selectively engaged; and
a differential drive gear through which a rotation of the output shaft is transmitted to the differential.

2. The motor drive assembly according to claim 1, wherein the inner diameter of the rotor core mounting portion is larger than an outer diameter of the first bearing.

3. The motor drive assembly according to claim 1, wherein the first shaft portion and the rotor core mounting portion are integrally formed from a single member.

4. The motor drive assembly according to claim 1, wherein the rotor core mounting portion of the spindle has an open end portion on a second side of the rotor core mounting portion opposite from the first side of the rotor core mounting portion and remote from the speed reducer, and wherein the rotor core mounting portion is formed on an inner periphery of the rotor core mounting portion with a cylindrical surface on which the second bearing is fitted.

5. The motor drive assembly according to claim 1, wherein the speed reducer has a plurality of interchangeable speed reduction ratios.

6. The motor drive assembly according to claim 1, wherein the inner diameter of the rotor core mounting portion is larger than an outer diameter of the first bearing, and wherein the first shaft portion and the rotor core mounting portion are integrally formed from a single member.

7. The motor drive assembly according to claim 1, wherein the inner diameter of the rotor core mounting portion is larger than an outer diameter of the first bearing, wherein the rotor core mounting portion of the spindle has an open end portion on a second side of the rotor core mounting portion opposite from the first side of the rotor core mounting portion and remote from the speed reducer, and wherein the rotor core mounting portion is formed on an inner periphery of the rotor core mounting portion with a cylindrical surface on which the second bearing is fitted.

8. The motor drive assembly according to claim 1, wherein the first shaft portion and the rotor core mounting portion are integrally formed from a single member, wherein the rotor core mounting portion of the spindle has an open end portion on a second side of the rotor core mounting portion opposite from the first side of the rotor core mounting portion and remote from the speed reducer, and wherein the rotor core mounting portion is formed on an inner periphery of the rotor core mounting portion with a cylindrical surface on which the second bearing is fitted.

9. The motor drive assembly according to claim 1, wherein the inner diameter of the rotor core mounting portion is larger than an outer diameter of the first bearing, wherein the first shaft portion and the rotor core mounting portion are integrally formed from a single member, wherein the rotor core mounting portion of the spindle has an open end portion on a second side of the rotor core mounting portion opposite from the first side of the rotor core mounting portion and remote from the speed reducer, and wherein the rotor core mounting portion is formed on an inner periphery of the rotor core mounting portion with a cylindrical surface on which the second bearing is fitted.

10. The motor drive assembly according to claim 1, wherein the first clutch comprises:
a cylindrical surface formed on one of an inner periphery of the first output gear and an outer periphery of the output shaft;
cam surfaces formed on the other of the inner periphery of the first output gear and the outer periphery of the output shaft;
rollers incorporated between the respective cam surfaces and the cylindrical surface;
a first retainer retaining the rollers and rotatable relative to the output shaft between an engaged position in which the rollers are engaged between the respective cam surfaces and the cylindrical surface and a neutral position in which the rollers are not engaged between the respective cam surfaces and the cylindrical surface; and
a first switch spring biasing the first retainer such that the first retainer is kept in the neutral position,
wherein the second clutch comprises:
a cylindrical surface formed on one of an inner periphery of the second output gear and an outer periphery of the output shaft;
cam surfaces formed on the other of the inner periphery of the second output gear and the outer periphery of the output shaft;
rollers incorporated between the respective cam surfaces and the cylindrical surface;

a second retainer retaining the rollers and rotatable relative to the output shaft between an engaged position in which the rollers are engaged between the respective cam surfaces and the cylindrical surface and a neutral position in which the rollers are not engaged between the respective cam surfaces and the cylindrical surface; and a second switch spring biasing the second retainer such that the second retainer is kept in the neutral position.

11. The motor drive assembly according to claim 10, wherein the speed change actuator comprises:

a first friction plate rotationally fixed to the first retainer and movable in an axial direction between a first position where the first friction plate is in contact with a side surface of the first output gear and a second position where the first friction plate is spaced apart from the side surface of the first output gear;

a first separation spring biasing the first friction plate toward the second position;

a second friction plate rotationally fixed to the second retainer and movable in the axial direction between a third position where the second friction plate is in contact with a side surface of the second output gear and a fourth position where the second friction plate is spaced apart from the side surface of the second output gear;

a second separation spring biasing the second friction plate toward the fourth position;

a shift ring movable in the axial direction between a first shift position in which the first friction plate is pressed by the shift ring into contact with the side surface of the first output gear and a second shift position in which the second friction plate is pressed by the shift ring into contact with the side surface of the second output gear; and a shift mechanism configured to move the shift ring in the axial direction.

12. A motor drive assembly for a vehicle, comprising:

an electric motor including an annular stator and a rotor configured to rotate inside of the stator;

a speed reducer configured to reduce a rotation speed output from the electric motor; and a differential configured to distribute a rotation output from the speed reducer to right and left vehicle wheels, wherein the rotor of the electric motor comprises a first bearing located on a first side of the rotor close to the speed reducer, a second bearing located on a second side of the rotor opposite from the first side of the rotor and remote from the speed reducer, a spindle rotatably supported by the first bearing and the second bearing, and a rotor core mounted on an outer periphery of the spindle and configured to receive a rotating force from the stator, wherein the spindle comprises a first shaft portion having, on an outer periphery thereof, a cylindrical first bearing fitting surface on which the first bearing is fitted, a tubular, hollow, rotor core mounting portion having an inner diameter larger than a diameter of the first bearing fitting surface, and an end plate closing an end portion of the rotor core mounting portion on a first side of the rotor core mounting portion close to the speed reducer, wherein the first shaft portion is coupled to the end plate, and wherein the speed reducer comprises:

an input shaft to which a rotation of the electric motor is input;

a first input gear and a second input gear which are provided on the input shaft so as to be rotatable relative to the input shaft;

a first clutch incorporated between the first input gear and the input shaft;

a second clutch incorporated between the second input gear and the input shaft;

a speed change actuator by which either one of the first clutch and the second clutch is selectively engaged;

an output shaft arranged so as to be spaced apart from and be in parallel to the input shaft;

a first output gear and a second output gear which are provided on the output shaft so as to rotate together with the output shaft and which mesh with the first input gear and the second input gear, respectively; and a differential drive gear through which a rotation of the output shaft is transmitted to the differential.

13. The motor drive assembly according to claim 12, wherein the first clutch comprises:

a cylindrical surface formed on one of an inner periphery of the first input gear and an outer periphery of the input shaft;

cam surfaces formed on the other of the inner periphery of the first input gear and the outer periphery of the input shaft;

rollers incorporated between the respective cam surfaces and the cylindrical surface;

a first retainer retaining the rollers and rotatable relative to the input shaft between an engaged position in which the rollers are engaged between the respective cam surfaces and the cylindrical surface and a neutral position in which the rollers are not engaged between the respective cam surfaces and the cylindrical surface; and a first switch spring biasing the first retainer such that the first retainer is kept in the neutral position, wherein the second clutch includes:

a cylindrical surface formed on one of an inner periphery of the second input gear and an outer periphery of the input shaft;

cam surfaces formed on the other of the inner periphery of the second input gear and the outer periphery of the input shaft;

rollers incorporated between the respective cam surfaces and the cylindrical surface;

a second retainer retaining the rollers and rotatable relative to the input shaft between an engaged position in which the rollers are engaged between the respective cam surfaces and the cylindrical surface and a neutral position in which the rollers are not engaged between the respective cam surfaces and the cylindrical surface; and a second switch spring biasing the second retainer such that the second retainer is kept in the neutral position.

14. The motor drive assembly according to claim 13, wherein the speed change actuator comprises:

a first friction plate rotationally fixed to the first retainer and movable in an axial direction between a first position where the first friction plate is in contact with a side surface of the first input gear and a second position where the first friction plate is spaced apart from the side surface of the first input gear;

a first separation spring biasing the first friction plate toward the second position;

a second friction plate rotationally fixed to the second retainer and movable in the axial direction between a third position where the second friction plate is in contact with a side surface of the second input gear and a fourth position where the second friction plate is spaced apart from the side surface of the second input gear;

a second separation spring biasing the second friction plate toward the fourth position;

a shift ring movable in the axial direction between a first shift position in which the first friction plate is pressed by the shift ring into contact with the side surface of the first input gear and a second shift position in which the second friction plate is pressed by the shift ring into contact with the side surface of the second input gear; and a shift mechanism configured to move the shift ring in the axial direction.

15. The motor drive assembly according to claim 12, wherein the inner diameter of the rotor core mounting portion is larger than an outer diameter of the first bearing.

16. The motor drive assembly according to claim 12, wherein the first shaft portion and the rotor core mounting portion are integrally formed from a single member.

17. The motor drive assembly according to claim 12, wherein the rotor core mounting portion of the spindle has an open end portion on a second side of the rotor core mounting portion opposite from the first side of the rotor core mounting portion and remote from the speed reducer, and wherein the rotor core mounting portion is formed on an inner periphery of the rotor core mounting portion with a cylindrical surface on which the second bearing is fitted.

18. The motor drive assembly according to claim 12, wherein the speed reducer has a plurality of interchangeable speed reduction ratios.

19. The motor drive assembly according to claim 12, wherein the inner diameter of the rotor core mounting portion is larger than an outer diameter of the first bearing, and wherein the first shaft portion and the rotor core mounting portion are integrally formed from a single member.

20. The motor drive assembly according to claim 12, wherein the inner diameter of the rotor core mounting portion is larger than an outer diameter of the first bearing, wherein the rotor core mounting portion of the spindle has an open end portion on a second side of the rotor core mounting portion opposite from the first side of the rotor core mounting portion and remote from the speed reducer, and wherein the rotor core mounting portion is formed on an inner periphery of the rotor core mounting portion with a cylindrical surface on which the second bearing is fitted.

21. The motor drive assembly according to claim 12, wherein the first shaft portion and the rotor core mounting portion are integrally formed from a single member, wherein the rotor core mounting portion of the spindle has an open end portion on a second side of the rotor core mounting portion opposite from the first side of the rotor core mounting portion and remote from the speed reducer, and wherein the rotor core mounting portion is formed on an inner periphery of the rotor core mounting portion with a cylindrical surface on which the second bearing is fitted.

22. The motor drive assembly according to claim 12, wherein the inner diameter of the rotor core mounting portion is larger than an outer diameter of the first bearing, wherein the first shaft portion and the rotor core mounting portion are integrally formed from a single member, wherein the rotor core mounting portion of the spindle has an open end portion on a second side of the rotor core mounting portion opposite from the first side of the rotor core mounting portion and remote from the speed reducer, and wherein the rotor core mounting portion is formed on an inner periphery of the rotor core mounting portion with a cylindrical surface on which the second bearing is fitted.

* * * * *